United States Patent
Wang et al.

(10) Patent No.: US 7,426,346 B2
(45) Date of Patent: Sep. 16, 2008

(54) SYSTEM AND METHOD FOR PREVENTING SIGNAL LOSS IN AN OPTICAL COMMUNICATIONS NETWORK

(75) Inventors: Steve Wang, San Jose, CA (US); Frank Levinson, Palo Alto, CA (US)

(73) Assignee: Finisar Corporation, Sunnyvale, CA (US)

( * ) Notice: Subject to any disclaimer, the term of this patent is extended or adjusted under 35 U.S.C. 154(b) by 621 days.

(21) Appl. No.: 10/422,920

(22) Filed: Apr. 23, 2003

(65) Prior Publication Data

US 2004/0022535 A1 Feb. 5, 2004

Related U.S. Application Data

(60) Provisional application No. 60/418,445, filed on Oct. 15, 2002, provisional application No. 60/400,307, filed on Aug. 1, 2002.

(51) Int. Cl.
*G02F 1/00* (2006.01)
*G02B 6/26* (2006.01)
*G02B 6/42* (2006.01)

(52) U.S. Cl. ............................................ 398/5; 385/16

(58) Field of Classification Search ................. 398/1–8, 398/82–85, 79, 45–57; 385/18
See application file for complete search history.

(56) References Cited

U.S. PATENT DOCUMENTS

| | | | |
|---|---|---|---|
| 4,753,505 A | | 6/1988 | Mikami et al. |
| 5,321,774 A | * | 6/1994 | Barnard et al. ................. 385/16 |
| 5,680,235 A | * | 10/1997 | Johansson ........................ 398/7 |
| 5,751,456 A | * | 5/1998 | Koonen ........................ 398/85 |
| 5,777,761 A | * | 7/1998 | Fee ................................ 398/7 |
| 5,872,904 A | | 2/1999 | McMillen et al. |
| 6,002,823 A | | 12/1999 | Chandross et al. |

(Continued)

FOREIGN PATENT DOCUMENTS

DE 32 22 508 A1 1/1985

(Continued)

OTHER PUBLICATIONS

Thylen, L., "Integrated Optics in LiNbO$_3$: Recent Developments in Devices for Telecommunications" pp. 2,6,7, 21,22, 24-27, vol. 6, No. 6, Jun. 1, 1998.

(Continued)

*Primary Examiner*—Shi K Li
(74) *Attorney, Agent, or Firm*—Workman Nydegger

(57) ABSTRACT

A redundant optical signal transmission and reception system is disclosed to enable information exchange via an optical communications network without data loss in the event of optical transmitter or receiver failure. In one embodiment, the redundant optical signal system includes a primary transmission link comprising a plurality of optical transmitters and a multiplexor for modulating and combining electrical signals into a primary multiplexed optical signal. In the event of failure of an optical transmitter, a backup transmission link is activated to compensate for the malfunctioning transmitter. The backup transmission link utilizes a backup optical transmitter to modulate the electric signal formerly received by the malfunctioning optical transmitter. The backup transmission link combines the backup optical signal with the primary multiplexed optical signal to form a complete optical signal for transmission over the optical network. In another embodiment, a similar process is performed for providing backup optical signal reception.

11 Claims, 3 Drawing Sheets

U.S. PATENT DOCUMENTS

| | | | |
|---|---|---|---|
| 6,041,152 A * | 3/2000 | Clark | 385/24 |
| 6,172,782 B1 * | 1/2001 | Kobayashi | 398/9 |
| 6,307,986 B1 * | 10/2001 | Duerksen et al. | 385/24 |
| 6,415,074 B1 * | 7/2002 | Donald et al. | 385/24 |
| 6,567,579 B2 | 5/2003 | Foltzner | |
| 6,650,840 B2 * | 11/2003 | Feldman | 398/21 |
| 6,748,179 B2 * | 6/2004 | Lange et al. | 398/177 |
| 7,174,096 B2 * | 2/2007 | Berthold et al. | 398/5 |
| 2002/0024706 A1 * | 2/2002 | Meli | 359/173 |

FOREIGN PATENT DOCUMENTS

| | | |
|---|---|---|
| EP | 0 367 682 | 5/1990 |
| WO | WO 97/22907 | 6/1997 |

OTHER PUBLICATIONS

Sakuma, Ken; Ogawa, Hirokuni; Fujita, Daigo; Hosoya, Hideyuki, "Polymer Y-Branching Thermo-Optics Switch For Optical Fiber Communications Systems" Optical Communications Technology Department, Oct. 24, 2001.

* cited by examiner

SYSTEM AND METHOD FOR PREVENTING SIGNAL LOSS IN AN OPTICAL COMMUNICATIONS NETWORK

RELATED APPLICATIONS

This application claims the benefit of U.S. Provisional Patent Application Ser. No. 60/400,307, filed Aug. 1, 2002, and of U.S. Provisional Patent Application Ser. No. 60/418,445, filed Oct. 15, 2002, which are incorporated herein by reference.

BACKGROUND OF THE INVENTION

1. The Field of the Invention

The present invention generally relates to optical communications networks. In particular, the present invention relates to systems and methods that provide redundant generation and reception of channels in a multiplexed optical signal.

2. The Related Technology

Fiber optic technology is increasingly employed as a method by which information can be reliably transmitted via a communications network. Networks employing fiber optic technology are known as optical communications networks, and are marked by high bandwidth and reliable, high speed data transmission.

Optical communications networks often employ a technique called wavelength division multiplexing (WDM) in order to maximize the amount of information that can be transmitted via the network. A plurality of optical transmitters are used at the transmission node of the optical network to transmit optical signals. Each optical transmitter receives an electric signal from a network device, such as a computer, and modulates the electric signal via a laser to an optical signal having a distinct wavelength, called a channel. The distinct channels from the plurality of optical transmitters are then combined by a multiplexor to form a multiplexed optical signal. The multiplexed WDM optical signal can then be transmitted via a single fiber optic cable to the optical network, such as a LAN backbone. The multiplexed optical signal is then received by a reception node of the network.

Once received by the reception node, the multiplexed optical signal is divided back into its constituent channels by a demultiplexor, and each channel is fed to one of a plurality of optical receivers for modulation into electrical signals. The electrical signals are then forwarded to a network device, such as a computer, for processing.

Though highly useful as a means for transmitting information, optical communications networks can occasionally suffer from certain device failures. For example, occasional failures can occur with either an optical transmitter in the transmitter bank, or an optical receiver in the receiver bank. When an optical transmitter fails, it fails to modulate the corresponding electrical signal into an optical signal channel, causing a void in the multiplexed optical signal. This can result in an undesirable loss of a significant amount of important data. Correspondingly, in the case of an optical receiver failure, the channel of the optical signal corresponding to the failed receiver is not converted into an electric signal, also resulting in an information void and unintended data loss. As may be appreciated, such transmitter or receiver failures can severely inhibit the effectiveness and operation of the optical communications network.

Known attempts for dealing with such transmitter failures have typically involved creating a full redundant set of backup optical transmitters, so that each channel has a primary transmitter and also has a backup transmitter which is used in the event of failure of the corresponding primary transmitter. Failure of optical receivers can also be managed using a similar full redundant set of backup optical receivers. Even though the use of a full redundant set of backup transmitters or receivers can reliably protect against the failure of a primary transmitter or receiver, the redundant system described above can be expensive to implement in an optical communications network. For instance, the use of redundant sets of backup optical transmitters or receivers doubles the number of transmitters or receivers in a transmission or reception node, since each channel has a primary and a backup component. This can dramatically increase the cost of optical networks so configured. Additionally, the full redundant sets of transmitters and receivers undesirably increase the complexity of the optical network.

A need therefore exists for a redundant optical communications network that can compensate for occasional optical transmitter or receiver failure by providing backup optical transmission and reception while avoiding the problems described above. Specifically, there is a need for an optical communications network having redundant transmission and reception capability that can be implemented in a simple and low-cost configuration.

BRIEF SUMMARY OF THE INVENTION

The present invention is directed to an optical communications system having redundant transmission and receiving capability. According to a first aspect of the invention, optical transmission redundancy is provided via a backup signal transmission link that operates in conjunction with a primary transmission link to provide an uninterrupted, multiplexed optical signal to a communications network. According to a second aspect of the invention, optical reception redundancy of a demultiplexed optical signal is similarly implemented via a backup signal reception link operating in conjunction with the primary reception link. Either the transmission redundancy, the reception redundancy, or both, can be implemented at a transmission node and a reception node of the optical communications network, respectively.

According to the first aspect of the invention, a primary optical signal transmission link is provided, generally including a transmitter bank including a set of primary optical transmitters. The transmitter bank is in communication with a multiplexor that combines the wavelength-distinct channels produced by the transmitters into a multiplexed optical signal.

In the event of failure of one of the primary transmitters in the transmitter bank, activation of a backup signal transmission link is commenced. The multiplexed optical signal, initially missing the channel formerly produced by the failed primary transmitter, is directed from the multiplexor to an optical circulator. The optical circulator redirects the incomplete, multiplexed optical signal to an optical switch, which passes the signal to an optical filter. At the same time, a tunable backup optical transmitter that is tuned to the wavelength of the failed transmitter and begins modulation of the signal formerly carried by the failed transmitter into an optical signal channel. The modulated channel of the backup transmitter passes through the optical filter, where it is combined with the multiplexed optical signal passed by the switch, thereby forming a complete multiplexed optical signal. The complete multiplexed signal is sent once again through the optical circulator, where it is redirected for transmission via the optical communications network.

Redundancy in the primary reception link of an optical communications network is similarly provided according to the second aspect of the invention. A backup signal reception link is used to work in conjunction with a primary signal reception link. The primary signal reception link generally comprises a demultiplexor that separates an incoming multiplexed optical signal into its constituent wavelength-specific channels. Each of the channels is distributed by the demultiplexor to one of a plurality of primary optical receivers disposed in a receiver bank.

In the event of the failure of one of the primary optical receivers in the receiver bank, activation of the backup signal reception link is initiated. An optical circulator redirects the incoming multiplexed signal to the backup reception link before its entry into the primary link. The multiplexed signal passes through an optical switch that opens upon failure of one of the primary optical receivers. After passing through the switch, the multiplexed signal is directed through a tunable optical filter. The optical filter is tuned such that all of the multiplexed signal is reflected by the filter except for the wavelength of the channel that corresponds to the failed primary optical receiver. This channel is allowed to pass through the tuned optical filter and is received by a backup optical receiver, which modulates and processes the channel as needed. The rest of the multiplexed signal, after reflection by the tunable optical filter, passes through the open optical switch and is sent once again through the optical circulator and directed to the primary signal reception link. Once received by the primary signal reception link, the remaining channels are processed by the demultiplexor and the primary receiver bank.

In this manner, the present invention enables redundancy to be implemented for optical transmission and reception operations performed in an optical communications network, while minimizing the number of components required to do so. The use of only a single redundant, tunable transmitter to compensate for the failure of any of the primary transmitter provide significant advantages compared to conventional systems. For instance, the use of only a single redundant transmitter eliminates the need for a full complement of backup transmitters, which greatly reduces the cost of the backup system, while providing reliable redundant transmission of optical signals. Similarly, the use of only a single redundant backup receiver significantly reduces the cost of implementing the backup reception system by eliminating the full complement of backup receivers.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

Figure 1:
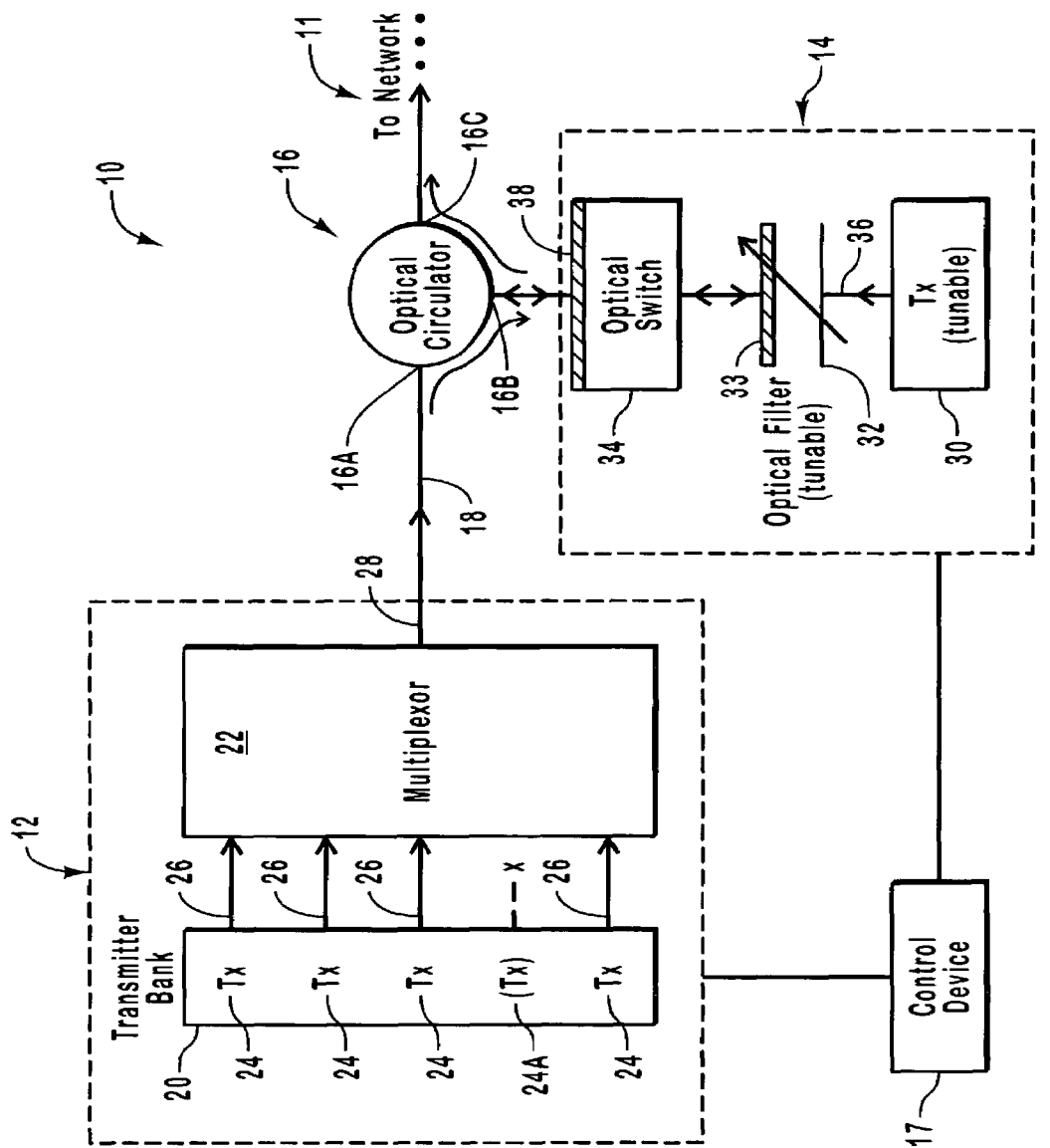
FIG. 1 is a block diagram showing various components comprising one embodiment of the present system for providing redundant optical transmission.
Figure 2:
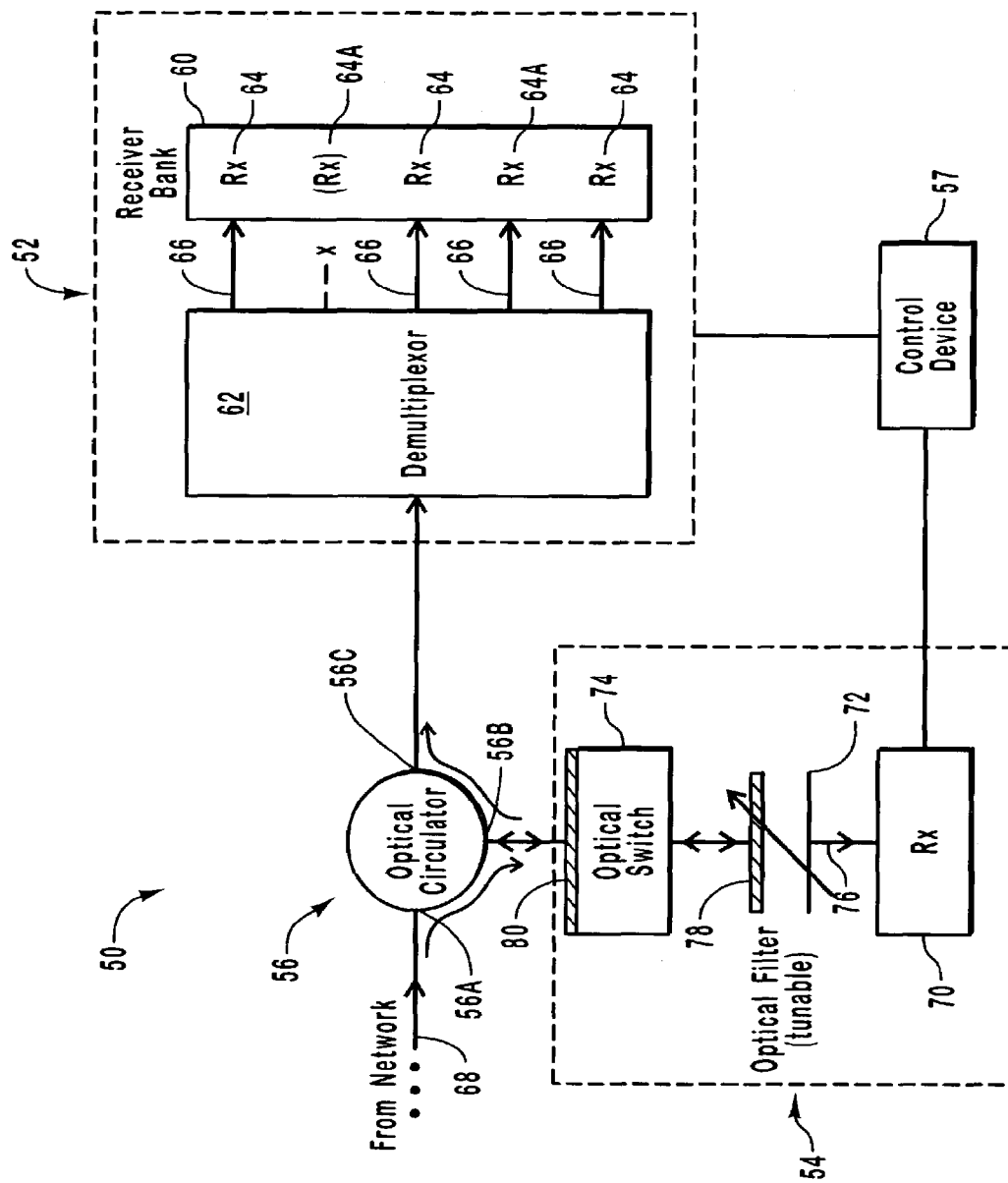
FIG. 2 is a block diagram showing various components comprising another embodiment of the present system.
Figure 3:
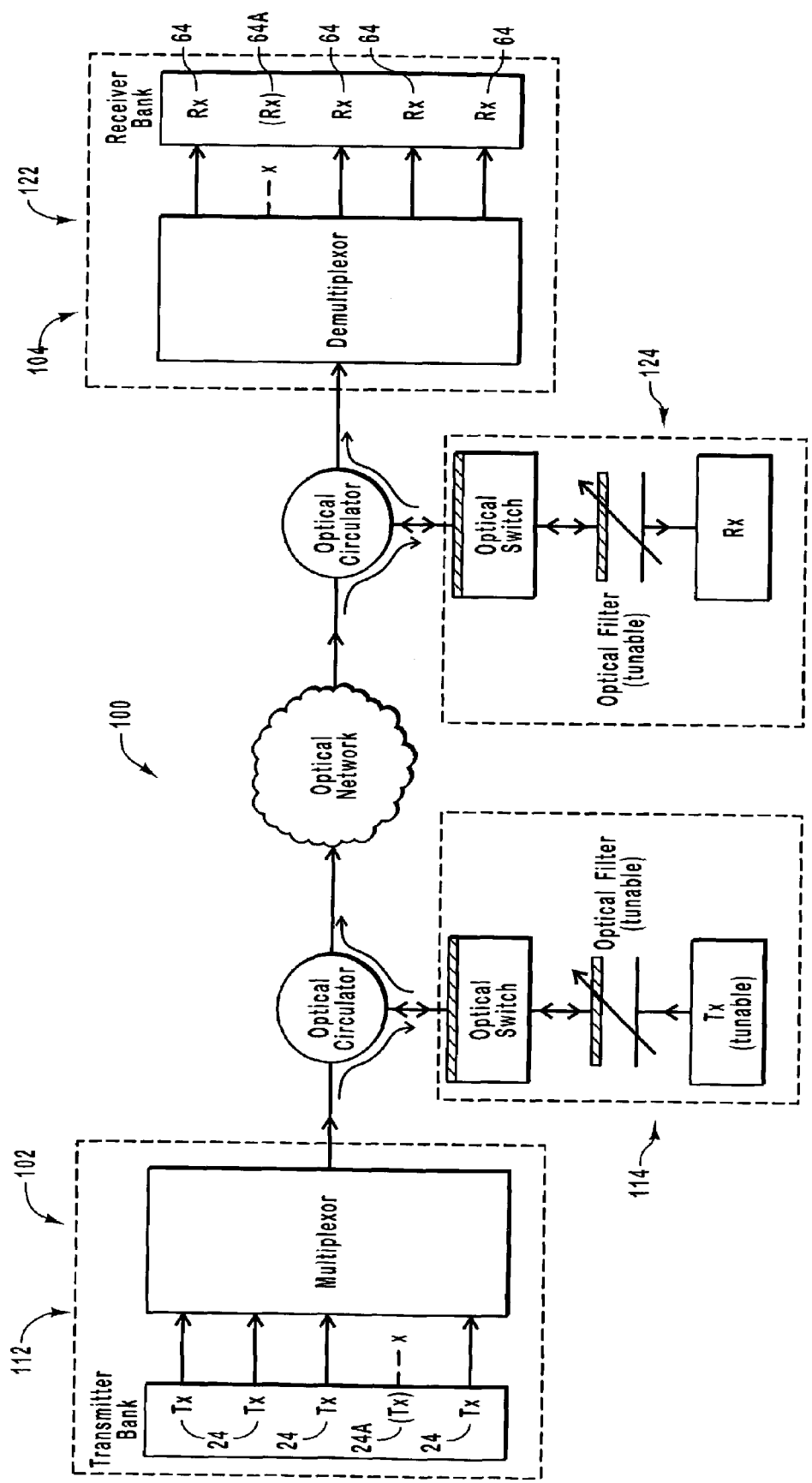
FIG. 3 is a block diagram showing various components comprising yet another embodiment of the present system.
Figure 3:
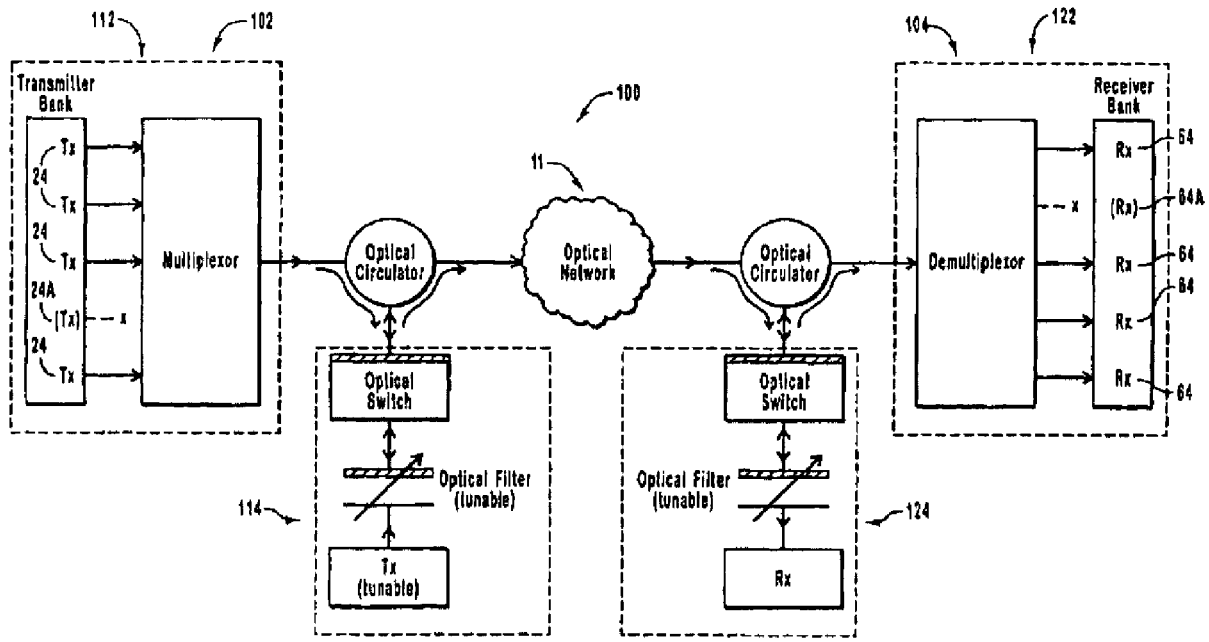

FIGS. 1-3 depict various features of embodiments of the present invention, which is generally directed to an optical network communication system having redundant signal transmission and reception capability. The present system is implemented in such a way as to provide uninterrupted optical signal transmission and/or reception in the event of a failure of an optical transmitter or receiver. The present system is able to provide this signal transmission and reception redundancy in a simplified manner, thereby reducing its cost compared to known redundant systems.

Reference is first made to FIG. 1, which depicts various components comprising one presently preferred embodiment of an optical signal transmission backup system, generally designated at 10 in FIG. 1. The optical signal transmission system 10 is operably connected to an optical communications network 11, such as a local area network, for example. The optical signal transmission backup system 10 generally comprises a primary transmission link 12 and a backup transmission link 14. The primary transmission link 12 and backup transmission link 14 are operably connected via an optical circulator 16. Both links can also be connected to a control device 17 to enable control of the system 10, as detailed further below The optical circulator 16 additionally interconnects the primary transmission link 12 and the backup transmission link 14 to the rest of the optical network 11, as shown in FIG. 1. This interconnection is provided via a communications medium 18 comprising, in presently preferred embodiments, fiber optic cable. Details concerning each of these components are given below. The optical signal transmission system 10 is operably connected to an optical communications network 11, such as a local area network, for example.

In greater detail, the primary transmission link 12 comprises a transmitter bank 20 and a multiplexor 22. The transmitter bank 20 includes a plurality of optical transmitters 24. Each optical transmitter 24 is configured to receive an electrical signal from an electronic component, such as a computer (not shown). The electrical signal is input into the respective optical transmitter 24, which modulates the electrical signal to an optical signal, as is known in the art. Each optical transmitter 24 is configured to produce an optical signal having a distinct wavelength. Each wavelength-distinct optical signal is referred to here as a channel 26. Each channel 26 is directed to the multiplexor 22. Utilizing a process known as wavelength division multiplexing (WDM), the multiplexor 22 combines the various wavelength-distinct optical signal channels 26 produced by the respective optical transmitters 24 into a unitary multiplexed signal, shown in FIG. 1 as a primary optical signal 28. The primary optical signal 28, comprising the plurality of channels 26, can then be sent via the communications medium 18 to other parts of the optical network 11. In some embodiments, the optical transmitters 24 can be included in optical transceivers, integrating optical transmission and reception functions in a single component.

It is an eventuality that an optical transmitter disposed in the transmitter bank 20 will malfunction and cease to operate. In FIG. 1, a malfunctioning, or failed, transmitter is designated at 24A. As can be seen from FIG. 1, the malfunctioning optical transmitter 24A is unable to produce an optical signal channel 26 for receipt by the multiplexor 22. It is appreciated that any one of the optical transmitters 24 disposed in the transmitter bank 20 could malfunction at any time. When malfunction of the transmitter 24A occurs, a void is created in the data carried by the primary optical signal 28. As can be appreciated, this can result in significant data loss within the communications network 11 in the absence of the present invention.

The optical signal backup system 10 of the present invention is designed so as to prevent the loss of data transmission in the optical communications network 11 due to malfunction or failure of an optical transmitter, such as that designated at 24A. The backup functionality of the present backup system 10 is implemented via the backup transmission link 14 as shown in FIG. 1. The backup transmission link 14 is configured to produce a backup optical signal channel to replace the primary optical signal channel that would be transmitted by the optical transmitter 24A had malfunction not occurred. The backup transmission link 14 is further able to combine the backup channel with the primary optical signal 28, thereby creating a complete multiplexed optical signal (e.g., a WDM optical signal) for transmission to the optical communications network 11, as explained further below.

In one presently preferred embodiment, the backup transmission link 14 generally comprises a tunable backup optical transmitter 30, a tunable optical filter 32 and an optical switch 34. The tunable backup optical transmitter 30 is capable of producing an optical signal channel over a wide range of optical wavelengths. Specifically, the tunable backup optical transmitter 30 is configured to produce an optical signal channel 26 having a wavelength that corresponds to any of the wavelengths of the optical signal channels 26 produced by the optical transmitters 24 disposed in the transmitter bank 20. Upon learning of the disclosure made herein, those of skill in the art will be able to identify and select tunable optical transmitters that can be used as a tunable backup optical transmitter 30 according to the invention.

As illustrated, then, the tunable backup transmitter 30 in the present embodiment is configured to receive an electrical signal originally destined for the malfunctioning transmitter 24A and modulate it to produce a backup optical signal channel 36 that corresponds in wavelength to the optical signal channel formerly produced by the malfunctioning optical transmitter 24A. In this way, the tunable backup transmitter 30 can replace the functionality of any malfunctioning optical transmitter in the transmitter bank 20, as described in more detail below. In one embodiment, the backup optical transmitter 30 can be included in an optical transceiver. Again, it is appreciated that the malfunctioning optical transmitter 24A is merely representative of any one of the optical transmitters 24 that might malfunction; therefore, optical transmitter 24A is not intended to comprise any particular transmitter.

It is often desirable that the backup channel 36 produced by the backup transmitter 30 be as free from unwanted signal noise as possible. In the present embodiment, optimization of the backup channel 36 is accomplished by the tunable optical filter 32. The optical filter 32 is disposed in the backup transmission link 14 between the backup transmitter 30 and the optical switch 34 so as to receive the backup channel 36 from the backup transmitter and filter it such that errant noise in the signal is reduced or eliminated. The optical filter 32 is tuned to the wavelength of the backup signal 36 to perform the noise reduction. Coordination of the wavelength of both the backup transmitter 30 and the optical filter 32 can be accomplished by the control device 17, which in presently preferred embodiments comprises a computing device or microprocessor. The optical filter 32 is also responsible for combining the backup channel with the primary optical signal 28. To this end, the optical filter 32 further comprises a reflective component 33, which is utilized as explained further below.

The optical switch 34 acts as a gate by which the primary optical signal 28 can either be transmitted through the switch or reflected by it, according to the state of the switch. Accordingly, in its reflective state, the optical switch 34 reflects the primary optical signal 28 back to the optical circulator 16 from which it was sent. In its open state, corresponding to malfunction of an optical transmitter 24, the optical switch 34 allows the primary optical signal 28 to pass through the switch and proceed to the optical filter 32, as explained further below in connection with operation of the backup transmission link 14.

One example of the optical switch 34 can be found in U.S. Provisional Patent Application Ser. No. 60/418,445, filed Oct. 15, 2002, which is incorporated herein by reference. This application has also claimed the benefit of the filing date of U.S. Provisional Patent Application Ser. No. 60/418,445. In brief, an optical switch made in accordance with the teachings of the above-named application includes a substrate having first and second optical signal waveguides disposed thereon. The second waveguide intersects with the first waveguide at a specified angle to define an intersection region. An electrode heater is disposed atop or adjacent to a portion of the intersection region. In the open state, heating of the portion of the intersection region by the electrode heater causes the index of refraction to change in the heated portion of the intersection region with respect to the unheated portion. This creates a refractive index boundary within the intersection region, which enables an optical signal to be deflected from one of the waveguides to the other waveguide. Also, a reflective component, schematically represented at 38 in FIG. 1, is disposed in a terminal end of the first waveguide to reflect any optical signals incident upon it during operation of the switch. In some embodiments, the reflective component 38 can comprise a discrete component from the optical switch 34. The state of the optical switch 34 can be controlled by the control device 17.

The optical switch 34 described above operates to allow passage of the primary optical signal 28 as generally described herein. During normal operation, the switch 34 is in the reflective state. In this state, the primary optical signal 28 that is sent to the switch 34 by the optical circulator 16 is received into a first end of the first waveguide of the switch. The primary optical signal 28 passes through the intersection region and impinges on a terminal end of the first waveguide. The reflective component 38 disposed on the terminal end of the first waveguide reflects the primary optical signal 28 back along the first waveguide in the opposite direction. The primary optical signal 28 then exits the switch 34 at the first end of the first waveguide and is directed back to the optical circulator 16.

When an optical transmitter 24 malfunctions, the optical switch 34 is changed to an open state. In this state, the primary optical signal 28 passes into the first end of the first waveguide, as before. The electrode heater is activated, thereby heating a portion of the intersection region. When the primary optical signal 28 enters the intersection region, the refractive index boundary causes the primary optical signal to be deflected to the second waveguide. The backup channel proceeds along the second waveguide and ultimately exits the switch 34 at an open end of the second waveguide. The primary optical signal 28 is then modified by the backup transmission link 14 as described further below. Further details concerning operation of the optical switch 34 in connection with the present invention are given hereafter.

According to presently preferred embodiments, the redundant optical signal transmission system 10 provides a complete multiplexed optical signal for use in the optical communications network 11 notwithstanding the malfunction of an optical transmitter. During normal operation, the primary transmission link 12 provides a primary optical signal 28, comprising the plurality of optical signal channels 26 that are produced by the plurality of optical transmitters 24, as described above. In the event that a malfunctioning optical transmitter 24A is detected, the backup transmission link 14 is activated. At this point, the tunable backup transmitter 30 is activated and immediately tuned to the optical wavelength formerly used by the malfunctioning optical transmitter 24A to modulate electrical signals from a connected device (not shown). The control device 17 immediately transfers the electrical signal input from the malfunctioning optical transmitter 24A to the now-tuned backup transmitter 30, which at once begins modulating the electrical signals to optical signals, thereby creating the backup optical signal channel 36 having the specified wavelength. At this point, the malfunctioning optical transmitter 24A is operably isolated from the redundant optical signal transmission system 10, with the tunable backup transmitter 30 now producing the backup channel 36 that replaces the channel produced by the optical transmitter 24A before malfunction occurred.

Simultaneous to the above event, the primary optical signal 28 that is produced by the multiplexor 22 is directed via the communications medium 18 to the optical circulator 16. As is known in the art, the optical circulator 16 is configured so as to receive incoming optical signals via a signal port and redirect the signals for output at the next consecutive signal port in a counterclockwise direction, as shown in FIG. 1. As illustrated, the primary optical signal 28 enters the optical circulator 16 at port 16A and is redirected by the circulator to exit at port 16B. Note that the primary optical signal 28 produced by the multiplexor 22 and initially received by the circulator 16 is incomplete in that it is missing the optical signal channel 26 from the malfunctioning optical transmitter 24A.

As a result of passing through the optical circulator 16 and exiting at port 16B, the primary optical signal 28 is directed through the optical switch 34, which has been changed from the reflective state to the open state by the control device 17 in response to failure of the transmitter 24A. The primary optical signal 28 is then directed to the tunable optical filter 32. While this is occurring, the backup channel 36 is transmitted from the tunable backup transmitter 30 through the tunable optical filter 32, which is tuned to the same wavelength as the backup transmitter. As described, passage of the backup channel 36 through the optical filter 32 removes noise from the channel.

At this point, the tunable optical filter 32 couples the primary optical signal 28 to the backup channel 36. This coupling is accomplished as follows. The primary optical signal 28, previously passed through the optical switch 34 to the optical filter 32, is reflected by the reflective component 33 of the filter upon contact, thereby redirecting the primary signal back toward the open optical switch and port 16B of the optical circulator. At the same time, the backup channel 36, passing through the optical filter 32, is coupled with the primary optical signal 28. This coupling converts the two signals into one complete multiplexed optical signal. The now-complete primary optical signal 28 enters the optical circulator port 16B and is redirected to exit the circulator at port 16C. At this point, the complete primary optical signal 28 is directed along the optical communications network 11 to its intended destination within the network. It is noted that synchronization of the backup channel 36 with the primary optical signal 28 at the reflective component 38 can be performed and controlled as needed by the control device 17. Thus, in the manner described above, the present invention provides for a complete multiplexed optical signal to be transmitted via the communications network 11 despite the failure of an optical transmitter.

Reference is now made to FIG. 2, which depicts features of a second embodiment of the present invention. As illustrated, a redundant optical signal reception system is generally designated at 50. The embodiment depicted in FIG. 2 shares common features with the embodiment described in connection with FIG. 1; therefore, only selected aspects of this embodiment will be discussed in detail hereinbelow.

The redundant optical signal reception system 50 shown in FIG. 2 generally comprises a primary reception link 52 and a backup reception link 54 for the redundant reception of multiplexed optical signals. Both the primary reception link 52 and the backup reception link 54 are interconnected to the optical communications network 11 via an optical circulator 56 having a counterclockwise input/output redirection flow, similar to the optical circulator 16 shown in FIG. 1.

The primary reception link 52 comprises a receiver bank 60 and a demultiplexor 62. The demultiplexor 62 is configured to receive a primary optical signal 68 from the optical communications network 11 via the communications medium 18, in this case, a fiber optic cable. The primary optical signal 28 is a multiplexed optical signal comprising multiple channels 66 of optical signals, each channel comprising a specific optical wavelength. The primary optical signal 68 is produced using wavelength division multiplexing techniques, as described earlier. As is well known, the demultiplexor 62 is operable to divide the primary optical signal 28 into its constituent wavelength-distinct channels 66. Each of the optical signal channels 66, after demultiplexing, is sent to the receiver bank 60.

The receiver bank 60 comprises a plurality of optical receivers 64, one receiver for each optical signal channel 66 received from the demultiplexor 62. Each optical receiver 64 is configured to receive a respective optical signal channel 66 and to modulate the channel from an optical signal to an electrical signal for use by a connected electronic device, such as a computer (not shown). Each optical receiver 64 disposed in the receiver bank 60 can comprise a dedicated receiver, or in one embodiment, can be included in an optical transceiver, having both optical transmitting and receiving functions. As illustrated, the receiver bank 60 can also include a malfunctioning optical receiver, generally designated at 64A. Because of its malfunction, the receiver 64A, which is representative of any one of the receivers disposed in the receiver bank 60, is unable to receive the optical signal channel 66 sent to it and modulate it into an electrical signal. As already discussed, this can cause a void in the data transmitted via the optical communications network 11.

The backup reception link 54 provides backup reception capabilities to compensate for the loss of information that would otherwise occur with the malfunctioning optical receiver 64A. The backup reception link 54 comprises a backup optical receiver 70, a tunable optical filter 72 and an optical switch 74.

In greater detail, the backup optical receiver 70 is configured to receive one optical signal channel from the primary optical signal 68 via the tunable optical filter 72. The optical signal channel sent by the optical filter 72 to the backup receiver 70 is determined according to which optical receiver 64A has malfunctioned. As will be seen, the backup optical receiver 70 is able to receive the specified optical signal channel, originally intended for the malfunctioning receiver 64A, and to convert it into an electrical signal, thereby providing backup signal reception for the malfunctioning receiver.

The tunable optical filter 72, the second of three main components of the backup reception link 54, is tunable according to wavelength so as to allow only one optical signal channel of the multiplexed primary optical signal 68 incident upon it to pass therethrough. The tunable optical filter 72 receives the primary optical signal 68 from the optical switch 74 as explained below. The optical signal channel having a specified wavelength that corresponds to the tuned wavelength of the optical filter 72 is allowed to pass therethrough to the backup optical receiver 70 and is known as a filtered optical signal channel 76. All other channels of the primary optical signal 68 incident upon the optical filter 72 are reflected, as will be seen. This can be accomplished by a reflective component 78 incorporated into the optical filter 72 that operates to reflect all channels not corresponding to the tuned wavelength of the filter.

The third component of the backup reception link 54, the optical switch 74, is configured to receive the primary optical signal 68 from the optical circulator 56 and to either reflect it, or to allow the signal to pass to the other backup components discussed above according to the need for the backup reception line 54. When all optical receivers 64 in the receiver bank 60 are functioning and the backup reception line 54 is not needed, the optical switch is in a reflective state, wherein the switch completely reflects the primary optical signal 68 back to the optical circulator 56. This reflection can be achieved by the use of a reflective component 80, schematically represented in FIG. 2. As before, the reflective component 80 can be integrated into the optical switch 74, or can comprise a discrete component that operates in cooperation with the switch. When the backup reception link 54 is needed to compensate for a malfunctioning receiver, however, the optical switch 74 is changed to an open state, wherein the switch passes the entire primary optical signal 68 to the optical filter 72 discussed above. As before, the optical switch 74 can be implemented as disclosed in U.S. Provisional Patent Application Ser. No. 60/418,445, filed Oct. 15, 2002, which has been incorporated herein by reference. The optical switch 74, as taught by the above-referenced application, is configured and operates in a similar fashion to the optical switch 34 discussed above in connection with the backup transmission link 14.

The components described above comprising the backup reception link 54 cooperatively operate to provide backup reception function for any one of the optical receivers 64 of the receiver bank 60 of the primary reception link 52. In operation, a primary optical signal 68 is received from the optical communications network 11. The primary optical signal 68, a complete multiplexed optical signal comprising a plurality of optical signal channels 66, is first received and input into a port 56A of the optical circulator 56. In the illustrated embodiment, the optical circulator 56 is configured to redirect optical signals in a counterclockwise fashion to the next succeeding inlet/outlet port. Thus, the primary optical signal 68 received into port 56A is redirected and exits the optical circulator 56 at port 56B. The primary optical signal 68 exits port 56B and is directed in succession to the optical switch 74. Depending on its state, the optical switch 74 either reflects the primary optical signal 68 back toward the port 56B of the optical circulator 56, or allows the entire signal to pass through the switch. The open or closed state of the optical switch 74, in addition to other control functions of the redundant optical signal reception system 50, can be controlled by a control device 57. If none of the optical receivers 64 in the receiver bank 60 are malfunctioning, the optical switch 74 remains in its reflective state and the primary optical signal 68 is reflected by the switch back to the port 56B. The primary signal 68 is then redirected by the optical circulator 56 and exits the circulator at port 56C. The primary optical signal 68 is then directed to the demultiplexor 62 and processed as already explained above.

In the event of malfunction or failure of one of the optical receivers 64, such as the receiver 64A, the backup reception link 54 is activated. When the backup reception link 54 is activated, the primary optical signal 68 that is directed from the port 56B of the optical circulator 56 is incident upon the optical switch 74. The optical switch 74 is changed from its reflective state to its open state by the control device 57, thereby allowing the entire primary optical signal 68 to pass therethrough. The primary optical signal 68 is then directed to the tunable optical filter 72, which has already been tuned to the wavelength of the optical signal channel 66 corresponding to the malfunctioning optical receiver 64A. The optical filter 72 tuned in this manner allows the specified optical signal channel, or filtered channel 76, to pass through the tunable optical filter. At the same time, the primary optical signal 68, now comprising all the optical signal channels 66 except filtered channel 76, is reflected by the reflective component 78 of the optical filter 72 to pass through the open optical switch 74 and then through the optical circulator 56 via ports 56B and 56C. Upon exiting port 56C, the primary optical signal 68 is received and processed by the demultiplexor 62 and receiver bank 60.

Simultaneous to the processing of the primary optical signal 68 by the demultiplexor 62, the filtered channel 76, after passing through the optical filter 72, is directed to and received by the backup optical receiver 70, which processes and modulates the channel. The electrical signal that results from this modulation is then forwarded, as are the modulated electrical signals from the receiver bank 60, to one or more electronic devices (not shown) as has been described. In this way, signal loss in the optical communications network because of the failure of an optical receiver is prevented via the backup reception link of the present invention. Thus, a complete optical signal is available at all times for use by the optical communications network 11.

Reference is now made to FIG. 3, which illustrates yet another embodiment of the present invention. FIG. 3 illustrates a redundant optical signal transmission and reception system 100, which combines the functionality of the redundant optical signal transmission system 10 and the redundant optical signal reception system 50 described in previous embodiments. The transmission and reception system 100 provides redundant backup transmission and reception capability for a transmission node and a reception node within an optical communications network 11.

Alternatively, as in previous embodiments, it is appreciated that the optical transmitters and receivers discussed herein can alternatively comprise optical transceivers having both transmission and reception capability. Further, it is appreciated that the transmission node 102 and the reception node 104 shown in FIG. 3 can be combined as a single network transmission/reception node, thereby enabling both backup reception and transmission capability to be performed in accordance with the present invention at a single node. An optical communications network can include one, two, or more such dual-purpose nodes.

As illustrated, the redundant transmission and reception system 100 features a transmission node 102 for transmitting multiplexed optical signals, and a reception node 104 for receiving and demultiplexing a multiplexed optical signal. The transmission node 102 comprises a primary transmission link 112 and a backup transmission link 114. The two links 112 and 114 cooperate to provide redundant optical signal transmission as in previous embodiments described herein. Similarly, the reception node 104 comprises a primary reception link 122 and a backup reception link 124 that cooperate to provide redundant optical signal reception as described in connection with previous embodiments. The transmission node 102 and the reception node 104 are interconnected with and comprise part of the optical communications network 11.

It is appreciated that the backup transmission links described in this and other embodiments can comprise more than one set of backup components for enabling backup optical signal transmission. For instance, the backup transmission link in one embodiment could comprise two each of the backup transmitter, the optical filter, and the optical switch. This configuration is useful in the event of failure of more than one primary optical transmitter in the primary transmission link. Similarly, the backup reception link described herein could also comprise a plurality of backup optical receivers, optical filters and optical switches so as to provide redundant reception capability in the event of failure of more than one primary optical receiver.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A backup optical signal transmission link for use in optically transmitting a multiplexed optical signal via an optical communications network, the multiplexed optical signal comprising a plurality of optical signal channels, each channel having a distinct wavelength, the backup optical signal transmission link operable to provide a specified optical signal channel missing from the multiplexed optical signal, the backup optical signal transmission link comprising:
   a wavelength-tunable backup optical transmitter operable to produce and transmit a backup channel to replace the specified channel that is missing from the multiplexed optical signal, the backup channel having the same wavelength as the specified channel;
   an optical switch switchable between an open state and a reflective state, wherein, when in the open state, the optical switch enables the multiplexed optical signal to pass through the switch when the multiplexed optical signal is missing the specified channel, and wherein, when in the reflective state, the optical switch reflects the multiplexed optical signal back toward the optical communications network;
   a wavelength-tunable optical filter operable to receive the backup channel from the backup optical transmitter, the optical filter also operable to receive the multiplexed optical signal missing the specified channel from the optical switch when the switch is in the open state, wherein the optical filter is configured to couple the backup channel to the multiplexed optical signal missing the specified channel to form a complete multiplexed optical signal, and wherein the optical filter is configured to direct the complete multiplexed optical signal toward the optical communications network;
   wherein the optical switch further comprises:
   a semiconductor substrate;
   a first waveguide disposed on the substrate, the first waveguide suitable for carrying an optical signal;
   a second waveguide disposed on the substrate, the second waveguide suitable for carrying an optical signal, the second waveguide intersecting the first waveguide at an angle so as to define an intersection region;
   a cladding material disposed atop the first and second waveguides;
   an electrode heater disposed atop the cladding material, the electrode heater being disposed proximate the intersection region, wherein heating of the electrode heater enables an optical signal to be diverted in the intersection region from one of said waveguides to the other waveguide; and
   a high reflective coating disposed at a terminal end of the first waveguide, the high reflective coating operable to reflect in the opposite direction an optical signal passing through the first waveguide that is incident on the high reflective coating.

2. A backup optical signal transmission link as defined in claim 1, wherein the optical filter is operable to remove optical noise in the backup channel, and wherein the optical filter is disposed between the backup optical transmitter and the optical switch.

3. A backup optical signal transmission link as defined in claim 1, wherein the high reflective coating comprises sodium.

4. A backup optical signal transmission link as defined in claim 1, further comprising a control device to control operation of the optical switch, the backup optical transmitter, and the optical filter.

5. A backup optical signal transmission link as defined in claim 1, wherein the backup optical transmitter comprises an optical transceiver.

6. A backup optical signal transmission link as defined in claim 1, wherein the backup optical signal transmission link further comprises a plurality of wavelength-tunable backup optical transmitters.

7. A backup optical signal reception link for use in modulating a multiplexed optical signal sent via an optical communications network, the multiplexed optical signal comprising a plurality of optical signal channels, each channel having a distinct wavelength, the backup optical signal reception link operable, when needed, to receive and modulate a specified optical signal channel from the multiplexed optical signal, the backup optical signal reception link comprising:
   an optical switch operable to receive the multiplexed optical signal, wherein, when the backup optical signal reception link is not needed, the optical switch reflects the multiplexed optical signal for redirection to a demultiplexor, and wherein the switch, when the backup optical switch reception link is needed, allows the redirected multiplexed optical signal to pass through the switch;
   an optical filter operable to receive the multiplexed optical signal that passes through the optical switch when the backup optical signal reception link is needed, wherein the optical filter is wavelength tunable such that the specified channel of the multiplexed optical signal is allowed to pass through the optical filter, and such that the other channels of the multiplexed optical signal are reflected by the optical filter for redirection to the demultiplexor;
   a backup optical receiver operable to receive and modulate the specified channel that is allowed to pass through the optical filter;

wherein the optical switch further comprises: a semiconductor substrate;

a first waveguide disposed on the substrate, the first waveguide suitable for carrying an optical signal;

a second waveguide disposed on the substrate, the second waveguide suitable for carrying an optical signal, the second waveguide intersecting the first waveguide at an angle so as to define an intersection region;

a cladding material disposed atop the first and second waveguides;

an electrode heater disposed atop the cladding material, the electrode heater being disposed proximate the intersection region, wherein heating of the electrode heater enables an optical signal to be diverted in the intersection region from one of said waveguides to the other waveguide; and a high reflective coating disposed at a terminal end of the first waveguide, the high reflective coating operable to reflect in the opposite direction an optical signal passing through the first waveguide that is incident on the high reflective coating, wherein the optical filter further comprises a reflective component that reflects the other channels of the multiplexed optical signal, and wherein the optical switch can be positioned in either an open or a reflective state, and wherein the multiplexed optical signal is allowed to pass through the optical switch when the switch is in the open state.

8. A backup optical signal reception link as defined in claim 7, wherein the high reflective coating comprises sodium.

9. A backup optical signal reception link as defined in claim 8, further comprising a control device to control operation of the optical switch, the optical filter, and the backup optical receiver.

10. A backup optical signal reception link as defined in claim 9, wherein the backup optical receiver comprises an optical transceiver.

11. A backup optical signal reception link as defined in claim 10, wherein the backup optical signal reception link is configured to receive and process a plurality of specified channels from the multiplexed optical signal.

* * * * *

UNITED STATES PATENT AND TRADEMARK OFFICE
CERTIFICATE OF CORRECTION

PATENT NO. : 7,426,346 B2 Page 1 of 2
APPLICATION NO. : 10/422920
DATED : September 16, 2008
INVENTOR(S) : Wang et al.

It is certified that error appears in the above-identified patent and that said Letters Patent is hereby corrected as shown below:

Drawings
Please replace the current drawing of Fig. 2 with the figure depicted below in which the "optical communications network 11" and the "communications medium 18" have been labeled.

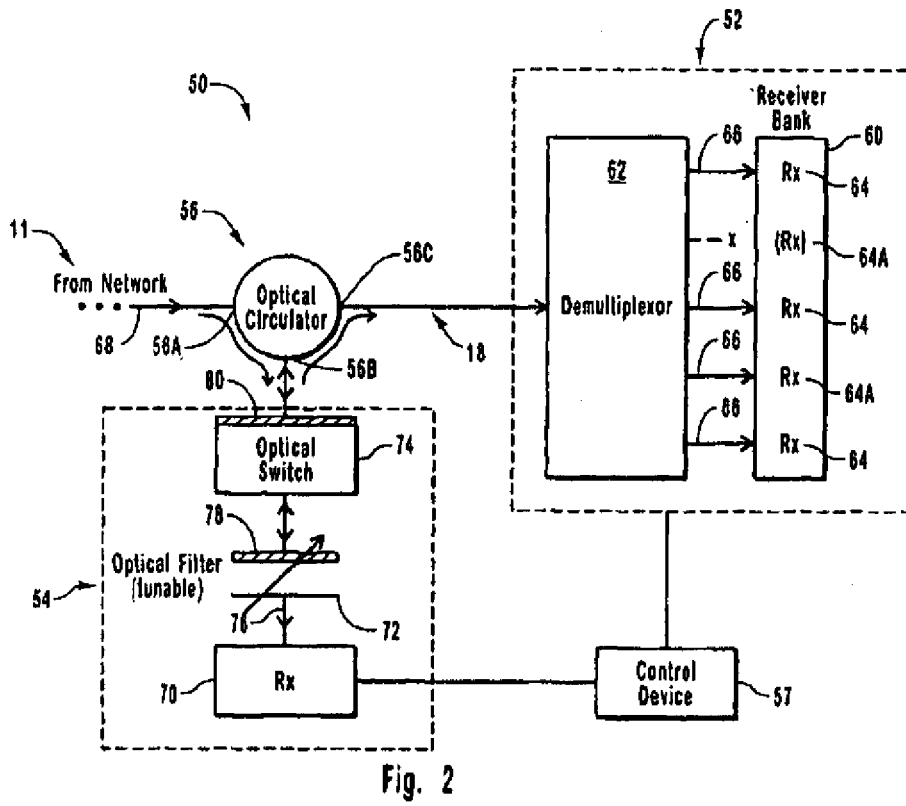

Fig. 2

Signed and Sealed this

Twenty-eighth Day of September, 2010

David J. Kappos
*Director of the United States Patent and Trademark Office*

Drawings

Please replace the current drawing of Fig. 3 with the figure depicted below in which the "optical communications network 11" has been labeled.

Column 3
Line 34, change "transmitter provide" to --transmitters provides--

Column 4
Line 32, change "below The" to --below. The--

Column 8
Lines 29 and 35, change "28" to --68--

Column 11
Line 17, change "each" to --of each--